No. 865,396. PATENTED SEPT. 10, 1907.
H. KLINGLER.
RESILIENT TIRE.
APPLICATION FILED JAN. 9, 1906.
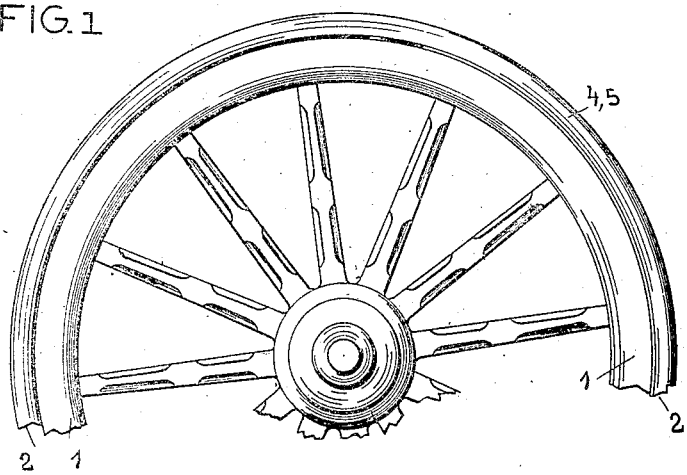
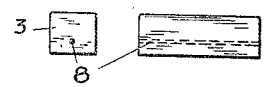
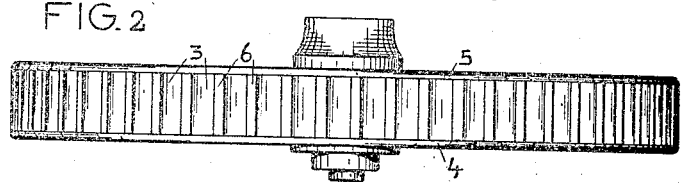
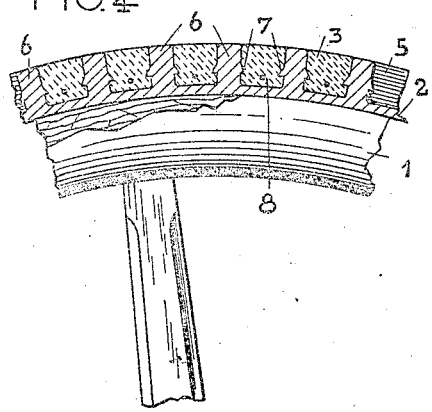
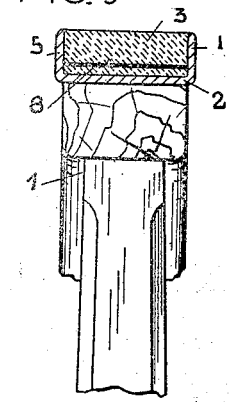

UNITED STATES PATENT OFFICE.

HERMANN KLINGLER, OF SITTERDORF, SWITZERLAND.

RESILIENT TIRE.

No. 865,396.　　Specification of Letters Patent.　　Patented Sept. 10, 1907.

Application filed January 9, 1906. Serial No. 295,315.

*To all whom it may concern:*

Be it known that I, HERMANN KLINGLER, a citizen of the Swiss Republic, residing at Sitterdorf, Canton Thurgau, in Switzerland, have invented certain new and useful Improvements in Resilient Tires, of which the following is a specification.

The present invention relates to a tire especially adapted for use with motor road vehicles and comprises a construction whereby both side-slip and skidding are entirely prevented and whereby also mud, snow and the like are prevented from accumulating on the tire.

The improved tire is represented in the accompanying drawing in which Figure 1 is a fragmentary side elevation of the tire in use. Fig. 2 a plan view. Fig. 3 a detail view. Fig. 4 a fragmentary longitudinal section and Fig. 5 a cross-section.

The tire comprises a rim 2 located upon a felly 1 of a wheel of any kind and provided with elastic cushions 3, the latter consisting for instance of rubber and in the present construction being of the form shown in Fig. 3.

The rim consists of a base 2 and flanges 4, 5 connected by stems or cross-pieces 6 so that open pockets are produced in which the elastic cushions 3 are located.

The cushions 3 are of such shape that they entirely fill the pockets when slightly compressed and they extend to the height of the cross pieces 6.

In order to prevent the cushions from falling out the cross-pieces 6 are laterally provided for the whole of their length with noses 7 so shaped that the cushions can be easily inserted from the exterior but cannot fall out being engaged by said noses similarly to a barbed hook. The security of the cushion may be further increased by introducing thereinto a spring-steel-wire 8 parallel to the cross-pieces 6.

When using the tire the rubber cushions 3 are so compressed that only the edges of the cross pieces 6 and the flanges 4, 5 engage the road surface. When the compressed part of the rim is relieved, the cushions 3 expand owing to their elasticity, whereby at the same time the adhering mud, snow or the like is forced out; the cushions act as buffers so that each part of the wheel used is entirely freed of mud and the like before it comes into use again.

Since mud ice or snow cannot accumulate on the tire side slip or skidding is entirely prevented and motor vehicles are thus rendered more safe on hills and frozen or snow covered roads.

Obviously the tire above described can be used with any other kind of vehicle and may also consist of segments adapted to be fixed to an iron tire or can be directly used as the felly.

What I claim as my invention and desire to secure by Letters Patent of the United States is:—

1. A tire comprising an exteriorly flanged rim, a plurality of cross-pieces integral with the base and flanges of said rim and forming with the flanges thereof exteriorly open pockets, said cross-pieces being flush with the flanges; resilient cushions located in said pockets and lateral noses on said cross-pieces for securing the cushions in the pockets substantially as described.

2. A tire comprising an exteriorly flanged rim, a plurality of cross-pieces integral with the said rim and forming with the flanges thereof exteriorly open pockets, resilient cushions located in said pockets lateral noses on said cross-pieces for securing the cushions in the pockets and metal wires traversing said cushions substantially as described.

In witness whereof I have signed this specification in the presence of two witnesses.

HERMANN KLINGLER.

Witnesses:
　TYMAR EGGER,
　JOH. DUTLI.